US008857389B2

(12) United States Patent
Mukouhara et al.

(10) Patent No.: US 8,857,389 B2
(45) Date of Patent: Oct. 14, 2014

(54) INTERNAL COMBUSTION ENGINE AND BACKLASH ADJUSTING DEVICE OF CAM DRIVING GEAR MECHANISM

(71) Applicant: Honda Motor Co., Ltd., Tokyo (JP)

(72) Inventors: Hodaka Mukouhara, Wako (JP); Hiroyuki Sugiura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/965,399

(22) Filed: Aug. 13, 2013

(65) Prior Publication Data

US 2014/0083220 A1 Mar. 27, 2014

(30) Foreign Application Priority Data

Sep. 27, 2012 (JP) ................. 2012-214407

(51) Int. Cl.
| | |
|---|---|
| *F01L 1/34* | (2006.01) |
| *F02B 67/04* | (2006.01) |
| *F16H 57/12* | (2006.01) |
| *F01L 1/02* | (2006.01) |
| *F16H 57/022* | (2012.01) |

(52) U.S. Cl.
CPC ........ *F16H 57/12* (2013.01); *F16H 2057/0224* (2013.01); *F02B 67/04* (2013.01); *F01L 1/02* (2013.01)

USPC .............. 123/90.16; 123/90.27; 123/90.31; 123/90.32

(58) Field of Classification Search
USPC ............ 123/90.16, 90.27, 90.31, 90.32
See application file for complete search history.

(56) References Cited

U.S. PATENT DOCUMENTS 7,156,060 B2 * 1/2007 Oshita et al. ............... 123/90.31

FOREIGN PATENT DOCUMENTS

JP 4381971 B2 10/2009

* cited by examiner

*Primary Examiner* — Ching Chang
(74) *Attorney, Agent, or Firm* — Squire Patton Boggs (US) LLP

(57) ABSTRACT

An internal combustion engine includes, among other things, a backlash adjusting device. An eccentric supporting shaft is disposed in an internal combustion engine so as to be able to be fixed at a predetermined rotational angle position about a central axis. The shaft adjusts an amount of clearance between a pair of gears, and is fitted over a base shaft fixed to the internal combustion engine such that the central axis of the eccentric supporting shaft coincides with an axis of the base shaft. An adjusting portion allows an inner circumference of the eccentric shaft to be fitted over an outer circumference of the base shaft at a predetermined rotational angle position. A fixing portion is configured to fix the eccentric supporting shaft to the base shaft.

16 Claims, 6 Drawing Sheets

INTERNAL COMBUSTION ENGINE AND BACKLASH ADJUSTING DEVICE OF CAM DRIVING GEAR MECHANISM

BACKGROUND

1. Field

The present invention relates to a backlash adjusting device of a cam driving gear mechanism in which members occupying the outside of an internal combustion engine can be reduced in number and miniaturized.

2. Description of the Related Art

Patent Document 1 (Japanese Patent No. 4381971 (FIG. 1, FIG. 2, and FIGS. 6 to 8)), for example, shows a mechanism capable of adjusting a clearance between an idler drive gear (driving gear) and an idle gear (driven gear) meshing with the idler drive gear, that is, a backlash in a cam driving gear mechanism for transmitting rotational power to the valve gear of an internal combustion engine, with a shaft supporting the idle gear formed as an eccentric shaft whose angle of rotation can be fixed at a predetermined angle of rotation.

The mechanism shown in Patent Document 1 has a structure in which an adjusting portion for adjusting the angle of rotation of the eccentric shaft and a fixing portion for fixing the angle of rotation of the eccentric shaft at a predetermined angle of rotation are both exposed to the outside of a cylinder block, and further the fixing portion fixes a flange portion of the adjusting portion with a bolt. Thus, an adjustment space for the flange portion needs to be secured on the outside of the cylinder block, which results in poor space efficiency on the outside of the internal combustion engine, and may consequently invite an increase in size of the internal combustion engine.

SUMMARY

It is an object of the present invention to provide a backlash adjusting device of a cam driving gear mechanism in which members occupying the outside of an internal combustion engine can be reduced in number and miniaturized.

In order to solve the above problems, there is provided a backlash adjusting device of a cam driving gear mechanism, wherein a rotational driving force of a crankshaft is transmitted to a valve gear of an internal combustion engine by the cam driving gear mechanism in which a driving gear and a driven gear for transmitting the driving force by meshing with each other are interposed. An eccentric supporting shaft rotatably supports at least one of the driving gear and the driven gear on an outer circumference of the eccentric supporting shaft, and has a central axis eccentric with respect to a center of an axis of rotation of the driving gear or the driven gear rotatably supported is disposed in the internal combustion engine so as to be able to be fixed at a predetermined rotational angle position about the central axis. The eccentric supporting shaft adjusts an amount of clearance between a pair of the driving gear and the driven gear. The eccentric supporting shaft is fitted over a base shaft fixed to the internal combustion engine such that the central axis of the eccentric supporting shaft coincides with an axis of the base shaft. The backlash adjusting device includes an adjusting portion allowing an inner circumference of the eccentric supporting shaft to be fitted over an outer circumference of the base shaft at the predetermined rotational angle position with respect to the base shaft, and a fixing portion for fixing the eccentric supporting shaft to the base shaft by fixing means screwed to the base shaft on the axis of the base shaft.

According to another embodiment of the invention, the base shaft is provided with a base shaft side spline engaging portion spline-engaged with the eccentric supporting shaft as a separate member. The base shaft side spline engaging portion comprises by a nut member having a female screw portion screwed on a male screw portion provided on the outer circumference of the base shaft, an engaging portion fixing device configured to fix the base shaft side spline engaging portion to a predetermined position of the male screw portion is provided. The base shaft side spline engaging portion and the engaging portion fixing device form the adjusting portion.

According to another embodiment of the invention, the engaging portion fixing device for fixing the base shaft side spline engaging portion comprises a second nut member screwed on the male screw portion of the base shaft.

According to another embodiment of the invention, a screw portion formed on the base shaft is formed in a screw direction as a tightening direction according to a direction of rotation of the driving gear or the driven gear supported by the eccentric supporting shaft fitted over the base shaft.

According to another embodiment of the invention, an outer edge of the fixing device for fixing the eccentric supporting shaft and the base shaft is in close contact with an entire circumference of an inner circumferential edge of a circular depression part formed at an outer end of the eccentric supporting shaft.

According to another embodiment of the invention, tool holes are disposed at predetermined intervals on a same pitch circle in an outer end surface of the eccentric supporting shaft.

According to another embodiment of the invention, a seal member is interposed between the outer circumference of the eccentric supporting shaft and a wall part of the internal combustion engine, the wall part supporting the eccentric supporting shaft.

According to another embodiment of the invention, the backlash adjusting device is provided to the driving gear or the driven gear provided directly to a cylinder head of the internal combustion engine.

In certain embodiments, the eccentric supporting shaft of the backlash adjusting device is fitted over the outer circumference of the base shaft fixed to the internal combustion engine, and the eccentric supporting shaft is fixed to the base shaft by the fixing device screwed on the axis of the base shaft as the fixing portion. Thus, the adjusting portion is disposed inside the eccentric supporting shaft, the fixing device is located on the axis of the base shaft, and the adjusting portion and the fixing portion can be disposed on the inside of an outside diameter of the eccentric supporting shaft. Consequently, the members occupying the outside of the internal combustion engine can be reduced in number, the internal combustion engine can be miniaturized, and the occurrence of noise from the cam driving gear mechanism can be prevented by the adjustment of a backlash in the cam driving gear mechanism.

In certain embodiments, the base shaft side spline engaging portion is formed by a member separate from the base shaft as the adjusting portion, screwed on the male screw portion of the base shaft, and fixed by the engaging portion fixing device. Thus, irrespective of the arrangement position of the splines, the base shaft side spline engaging portion can be fixed to the male screw portion at a free position, and the eccentric supporting shaft can be fixed on the entire circumference of the base shaft at a free rotational angle position, so that a degree of freedom of clearance adjustment is greatly improved.

In some embodiments, the engaging portion fixing device is formed by a second nut member. Thus, the base shaft side spline engaging portion can be fixed easily by a simple constitution based on double nut engagement.

In some embodiments, screw portions on the base shaft are formed in a tightening direction according to a direction of rotation of the driving gear or the driven gear. Thus, the loosening of the screw portions due to the rotation of the driving gear or the driven gear can be prevented.

In some embodiments, an outer edge of the fixing means is in close contact with the inside of an inner circumference of the eccentric supporting shaft at the outer end of the eccentric supporting shaft so as to cover the inside of the inner circumference of the eccentric supporting shaft. It is therefore possible to prevent dust from externally entering the inner circumferential side of the eccentric supporting shaft.

In certain embodiments, tool holes are provided. Therefore, the position of the eccentric supporting shaft can be adjusted easily even in a tentatively assembled state of the eccentric supporting shaft.

In some embodiments, a leak of oil inside the internal combustion engine can be prevented.

A backlash adjusting device can be provided easily without an increase in size by adopting the constitution of the backlash adjusting device according to the present invention particularly in the cylinder heads of an internal combustion engine desired to be miniaturized.

DETAILED DESCRIPTION

A backlash adjusting device of a cam driving gear mechanism according to embodiments of the present invention will hereinafter be described with reference to FIGS. 1 to 6.

Figure 5:
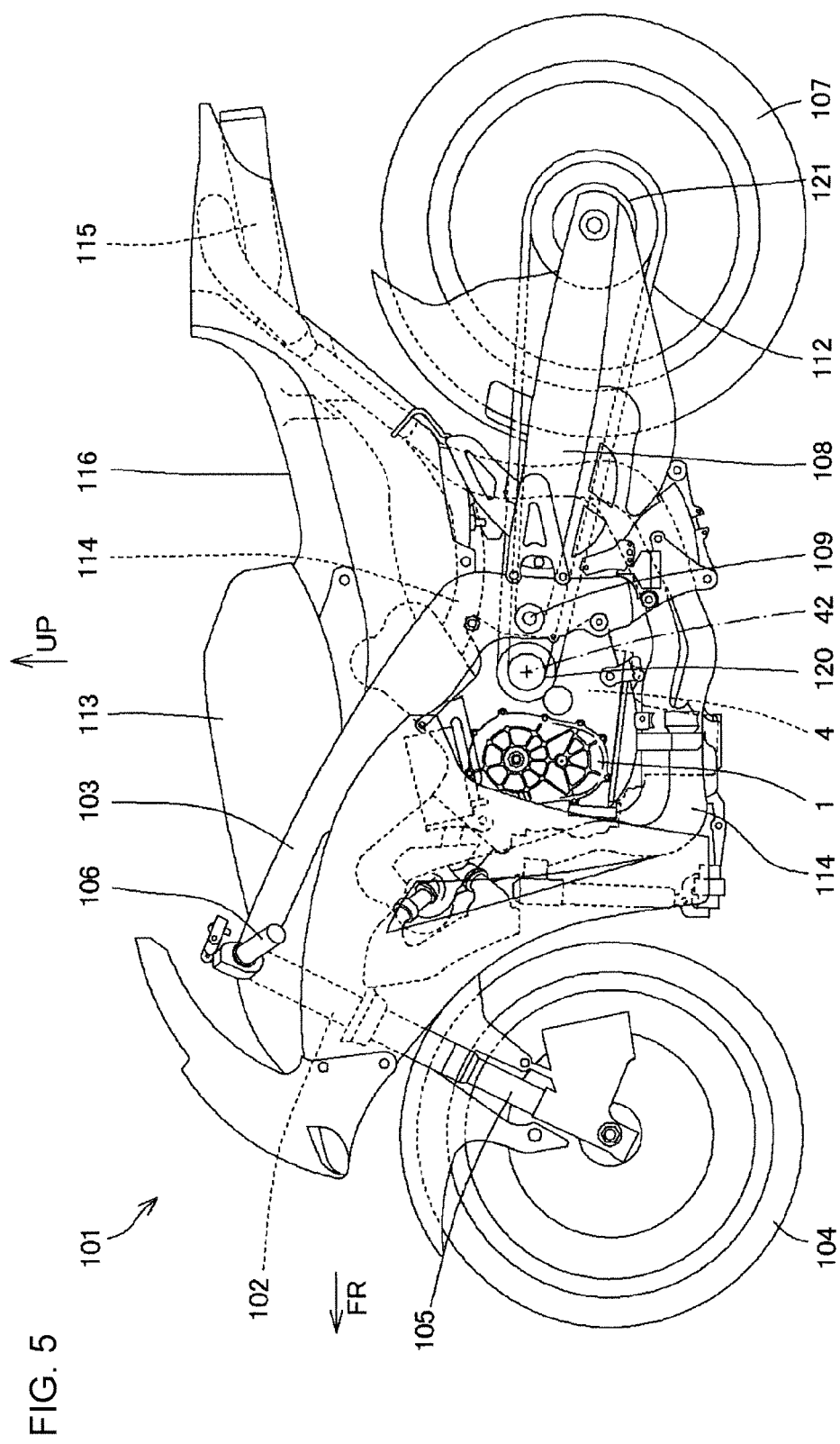
FIG. 5 is a left side view of the motorcycle mounted with the internal combustion engine according to embodiments of the present invention.

As shown in FIG. 5, the backlash adjusting device 8 of the cam driving gear mechanism 6 according to some embodiments is formed so as to be incorporated in an internal combustion engine 1 mounted in a motorcycle 101.

Suppose that directions such as a forward direction, a rearward direction, a left direction, a right direction, an upward direction, and a downward direction in the description and claims of the present specification are in accordance with the direction of a vehicle (motorcycle 101) in a state of the internal combustion engine 1 according to the present embodiment being attached to the motorcycle 101. In the figures, an arrow FR indicates the forward direction of the vehicle, an arrow LH indicates the left direction of the vehicle, an arrow RH indicates the right direction of the vehicle, and an arrow UP indicates the upward direction of the vehicle.

FIG. 5 is a left side view of the motorcycle 101 mounted with the internal combustion engine 1 according to embodiments of the present invention.

A head pipe 102 is provided to a vehicle front end part of the motorcycle 101. A vehicle body frame has a pair of main frames 103 branching to a left and a right from the head pipe 102 and extending rearward while slanting in a rearward and downward direction. The head pipe 102 steerably supports a front fork 105, which supports a front wheel 104. Steering handlebars 106 are coupled to an upper part of the front fork 105. The main frames 103 support a rear fork 108, which supports a rear wheel 107, such that the rear fork 108 is swingable upward and downward on a pivot bolt 109 via suspension means. The internal combustion engine 1 is mounted on the vehicle body frame.

The internal combustion engine 1 according to certain embodiments is a DOHC water-cooled V-type four-cylinder four-stroke-cycle internal combustion engine, and is integral with a constant-mesh type gear transmission (hereinafter referred to simply as a "transmission") 4 to form a so-called "power unit."

A counter shaft 42 of the internal combustion engine 1 is coupled to the rear wheel 107 via a transmission chain 112. A fuel tank 113 is provided over the internal combustion engine 1. Exhaust pipes 114 connected to exhaust ports extend out in front of and in the rear of the internal combustion engine 1. These exhaust pipes 114 are joined with each other, and connected to a muffler 115 above the rear wheel 107. A riding seat 116 is provided in the rear of the vehicle body frame.

Figure 6:
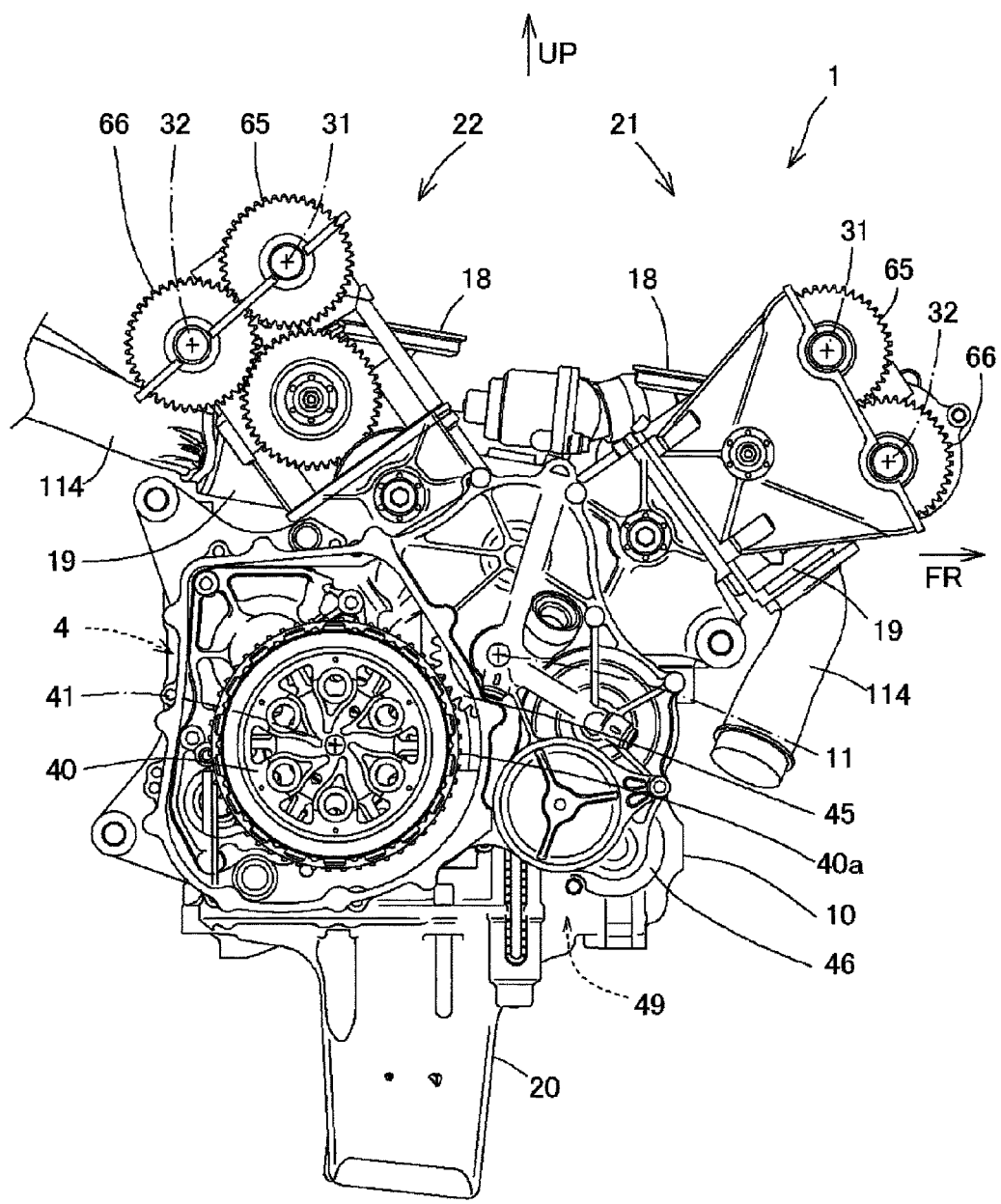
FIG. 6 is a right side view showing the internal combustion engine in FIG. 5 with a part of an outer shell removed.

FIG. 6 is a right side view of the internal combustion engine 1 in FIG. 5, showing the position of a part of gears with a part of an outer shell removed. A crankshaft 11 is provided to a crankcase 10 in a central part of the internal combustion engine 1. A primary drive gear 45 provided to the crankshaft 11 meshes with a primary driven gear 40a of the transmission 4. The primary driven gear 40a is provided to a multiple-disc friction clutch (hereinafter referred to simply as a "clutch") 40 of a main shaft 41 of the transmission 4.

An inlet port 18 and an exhaust port 19 are provided to each of a front bank 21 and a rear bank 22 of the V-type internal combustion engine. An exhaust pipe 114 connected to the exhaust port 19 is provided in front of the front bank 21 and in the rear of the rear bank 22. An inlet camshaft 31 and an exhaust camshaft 32 are provided to the top portion of each bank. A driven gear 65 for an inlet cam and a driven gear 66 for an exhaust cam are fixed to shaft ends of the respective shafts.

These gears 65 and 66 for the cams are driven by a cam driving gear mechanism (to be described later) 6 connected to a cam drive gear (to be described later) 61 provided to the crankshaft 11. A starter motor (not shown) of an engine starting device 60 is provided to a lower part of the crankcase 10. An oil pan 20 is connected below the crankcase 10.

Figure 1:
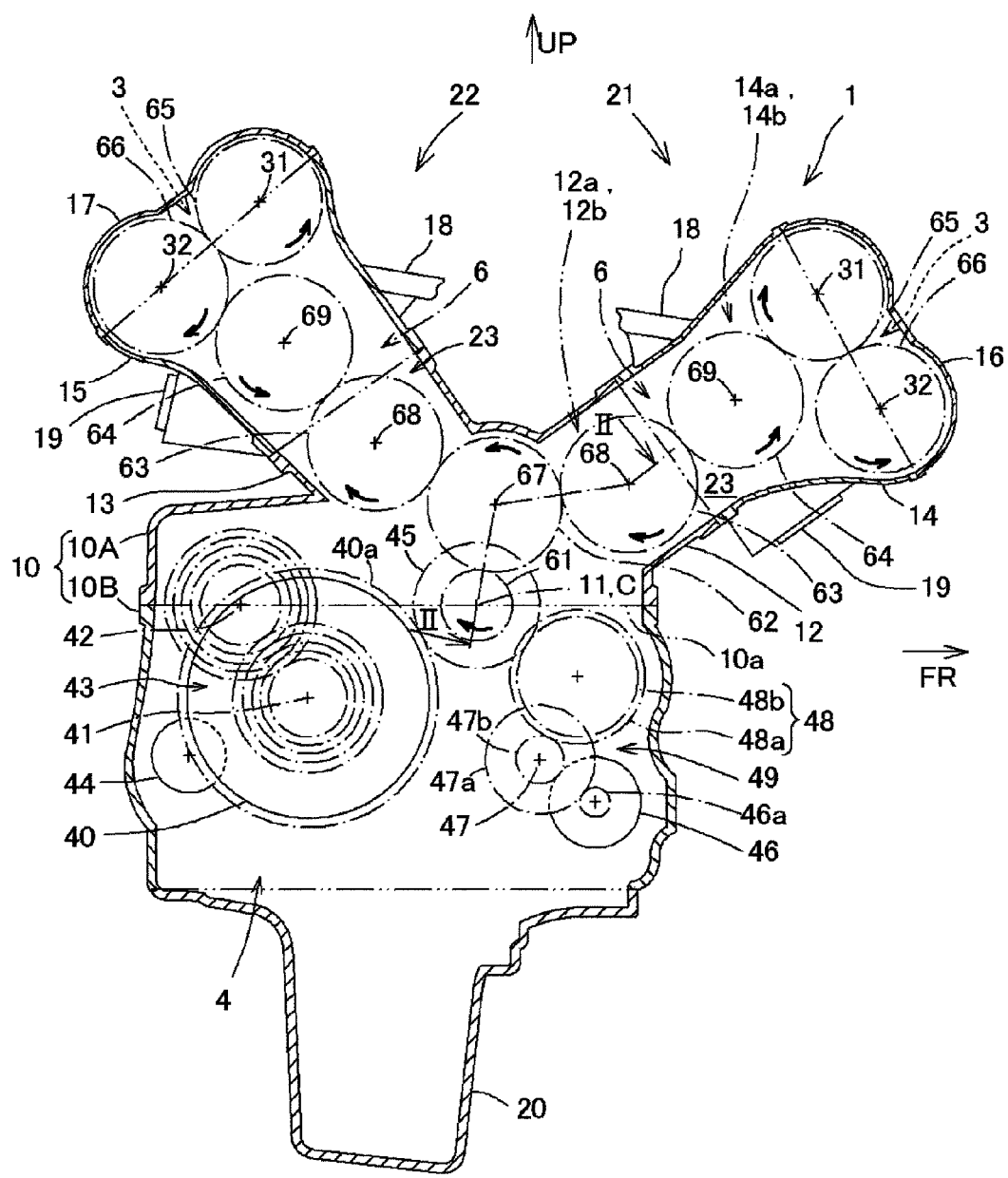
FIG. 1 is a right side view showing mainly an arrangement of a gear train connected to a crankshaft, which is shown in a position in a state of being mounted in a motorcycle, in an internal combustion engine including a backlash adjusting device of a cam driving gear mechanism according to embodiments of the present invention.

FIG. 1 is a right side view showing mainly an arrangement of a gear train connected to the crankshaft in the internal combustion engine 1 shown in a position in a state of being mounted in the motorcycle 101, with other constitutions omitted. In FIG. 1, a right direction shown in the figure is the forward direction of the vehicle, an upward direction shown in the figure is the upward direction of the vehicle, a far side shown in the figure is the left direction of the vehicle, and a near side shown in the figure is the right direction of the vehicle.

The central part of the internal combustion engine 1 is constituted by the crankcase 10 integrally formed by fastening an upper side crankcase 10A and a lower side crankcase 10B to each other at a mating surface 10a.

A front side cylinder block 12 including two cylinders not shown in the figure which cylinders are inclined to the front and a rear side cylinder block 13 including two cylinders not shown in the figure which cylinders are inclined to the rear are integrally formed in the upper side crankcase 10A.

The front side cylinder block 12 and the rear side cylinder block 13 form a V-shape as viewed from a side. A front side cylinder head 14 and a rear side cylinder head 15 are fastened respectively to upper end surfaces of the front side cylinder block 12 and the rear side cylinder block 13. Further, a front side cylinder head cover 16 and a rear side cylinder head cover 17 are fastened respectively to upper end surfaces of the front side cylinder head 14 and the rear side cylinder head 15.

The front side cylinder block 12, the front side cylinder head 14, and the front side cylinder head cover 16 form the front bank 21 of the V-type internal combustion engine 1, and the rear side cylinder block 13, the rear side cylinder head 15, and the rear side cylinder head cover 17 form the rear bank 22 of the V-type internal combustion engine 1.

The crankshaft 11 that has an axis of rotation C positioned on the mating surface 10a of the upper side crankcase 10A and the lower side crankcase 10B and which is oriented in the left-right direction of the vehicle is rotatably supported by the upper side crankcase 10A and the lower side crankcase 10B. Two pistons on the front side and two pistons on the rear side which pistons are not shown in the figures are coupled to the crankshaft 11 via respective connecting rods so as to correspond to the respective cylinders.

In addition, combustion chambers not shown in the figures are provided in the front side cylinder head 14 and the rear side cylinder head 15 so as to correspond to the respective cylinders of the front side cylinder block 12 and the rear side cylinder block 13, and the inlet ports 18 and the exhaust ports 19 are provided so as to communicate with the respective combustion chambers, as shown in FIG. 1.

Valve gears 3 for actuating inlet valves and exhaust valves not shown in the figures which valves open and close between the above combustion chambers and the inlet ports 18 and the exhaust ports 19 are provided so as to correspond to the respective cylinders within the front side cylinder head 14 and the front side cylinder head cover 16 and within the rear side cylinder head 15 and the rear side cylinder head cover 17.

The oil pan 20 is fastened to the lower end surface of the lower side crankcase 10B.

The transmission 4 is housed in the rear of the crankshaft 11 within the crankcase 10. The internal combustion engine 1 forms a so-called power unit.

The main shaft 41 of the transmission 4 which main shaft is parallel to the crankshaft 11 is rotatably supported in the rear of the crankshaft 11 and at an obliquely downward position with respect to the crankshaft 11 in the lower side crankcase 10B. In addition, a counter shaft 42 parallel to the crankshaft 11 is rotatably supported in the rear of the crankshaft 11 and the main shaft 41, in a state of being clamped at the mating surface 10a of the upper side crankcase 10A and the lower side crankcase 10B.

Gears paired with each other in a group 43 of speed change gears mounted respectively on the main shaft 41 and the counter shaft 42 mesh with each other. A gear change is made by a speed change operation mechanism of the transmission, which mechanism is not shown in the figures, so that a speed change is made. A reference numeral 44 in FIG. 1 denotes a shift drum forming a part of the speed change operation mechanism.

Clutch 40 is provided to a right end portion of the main shaft 41. The primary drive gear 45 on a right end side of the crankshaft 11 and the primary driven gear 40a on the side of the clutch 40 transmit the rotational power of the crankshaft 11 to the clutch 40. The clutch 40 is configured to be in a neutral state without transmitting the rotational power of the crankshaft 11 to the transmission 4 during a gear change of the transmission 4, and transmit the rotational power of the crankshaft 11 to the transmission 4 after an end of the gear change of the transmission 4.

The counter shaft 42 is also the output shaft of the internal combustion engine 1. As shown in FIG. 5, an output sprocket 120 is fitted to a left end portion of the counter shaft 42 that penetrates the crankcase 10 in the left direction and projects to the outside, and the transmission chain 112 is stretched between the output sprocket 120 and a driven sprocket 121 of the rear wheel 107, so that the power is transmitted to the rear wheel 107.

Reference numeral 46 in FIG. 1 denotes a starter motor. An output small gear 46a of the starter motor meshes with a large gear 47a of an idler shaft 47. A small gear 47b rotating integrally with the large gear 47a meshes with an input gear 48a of a one-way clutch 48. An output gear 48b of the one-way clutch 48 meshes with the primary drive gear 45. These gears form a motor starting mechanism 49.

In FIG. 1, reference numeral 6 denotes a cam driving gear mechanism (so-called gear train mechanism) for transmitting the rotational power of the crankshaft 11 to the inlet camshafts 31 and the exhaust camshafts 32 forming the valve gears 3 of the internal combustion engine 1.

Figure 2:
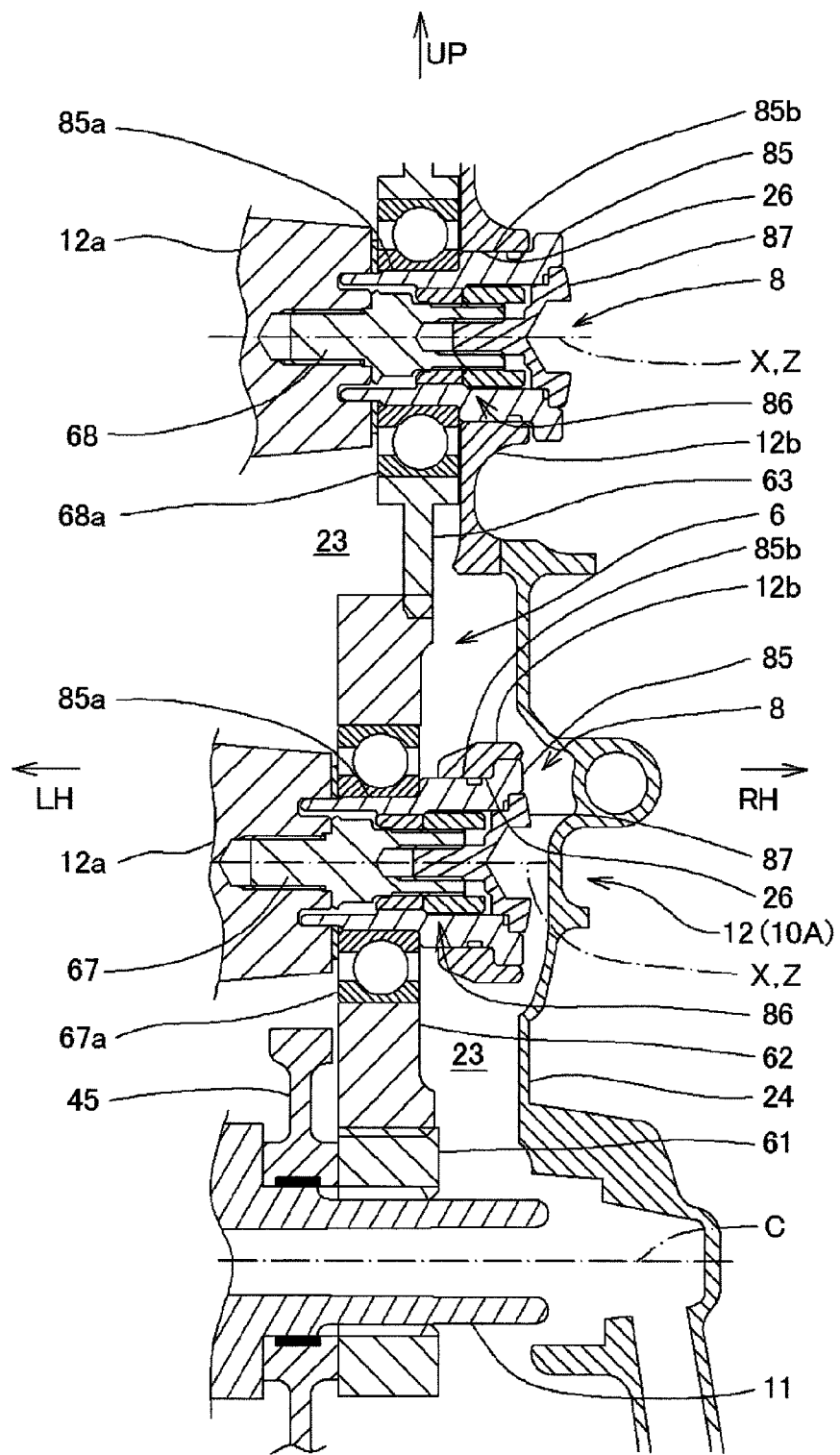
FIG. 2 is a partial sectional view of the cam driving gear mechanism on the side of a front bank, which sectional view is taken in the direction of arrows along a line II-II in FIG. 1.

As shown in FIG. 2, the primary drive gear 45 is coaxially provided to a right side portion of the crankshaft 11, and the cam drive gear 61 is coaxially provided on a right side of the primary drive gear 45 so as to adjoin the primary drive gear 45.

The cam drive gear 61 forms a part of the cam driving gear mechanism 6. As shown in FIG. 1, the rotational power from the cam drive gear 61 is transmitted to a single second gear (idle gear) 62 located above the cam drive gear 61, and thereafter distributed and transmitted to a pair of a front third gear and a rear third gear (idle gears) 63 located on the right side of the front side cylinder block 12 and the rear side cylinder block 13.

Because the cam driving gear mechanisms 6 in the front bank 21 and the rear bank 22 have a similar constitution, description in the following will be made of the side of the front bank 21.

As shown in FIG. 2, the cam driving gear mechanism 6 in the front bank 21 is provided within a cam driving gear mechanism chamber 23 formed so as to stretch at right ends of the front side cylinder block 12 and the front side cylinder head 14.

The rotational power in the cam driving gear mechanism 6 is transmitted from the cam drive gear 61 to the second gear 62 and from the second gear 62 to the third gear 63 in the front side cylinder block 12 within the crankcase 10, transmitted from the third gear 63 to a fourth gear (idle gear) 64 located on the right side of the front side cylinder head 14, and then further distributed and transmitted from the fourth gear 64 to the driven gear 65 for the inlet cam which driven gear is coaxially fixed to the right side end of the inlet camshaft 31 and further to the driven gear 66 for the exhaust cam which driven gear is coaxially fixed to the right side end of the exhaust camshaft 32.

Small back arrows attached to the respective gears forming the cam driving gear mechanism 6 in FIG. 1 indicate directions of rotation of the respective gears.

As shown in the example of FIG. 1, in the rear bank 22, the rotational power is transmitted from the cam drive gear 61 to the second gear 62 and from the second gear 62 to the third gear 63 in the rear side cylinder block 13 within the crankcase 10, and transmitted from the fourth gear 64 to the driven gear 66 for the exhaust cam and then to the driven gear 65 for the inlet cam in this order.

The second gear 62, the third gear 63, and the fourth gear 64 form idle gears that relay the rotational power between the cam drive gear 61 and the driven gears 65 and 66 for the inlet cam and for the exhaust cam.

The second gear 62 is a driven gear in relation to the cam drive gear 61, and is a driving gear in relation to the third gear 63. The third gear 63 is a driven gear in relation to the second gear 62, and is a driving gear in relation to the fourth gear 64. The fourth gear 64 is a driven gear in relation to the third gear 63, and is a driving gear in relation to the driven gear 65 for the inlet cam or the driven gear 66 for the exhaust cam.

The rotation of the cam drive gear 61 rotating together with the crankshaft 11 is thereby transmitted accurately via the idle gears 62, 63, and 64 formed by a plurality of gears to the pair of the front and rear driven gears 65 and 66 for the inlet cam and for the exhaust cam, which driven gears are separated from the crankshaft 11.

The cam driving gear mechanism 6 is configured such that the driven gears 65 and 66 for the inlet cam and for the exhaust cam make one rotation each time the crankshaft 11 makes two rotations (equal to two rotations of the cam drive gear 61). The inlet camshaft 31 and the exhaust camshaft 32 of the valve gear 3 thereby rotate in predetermined timing to open and close the inlet valve and the exhaust valve not shown in the figures in predetermined timing.

FIG. 2 is a sectional view of the cam driving gear mechanism 6 on the side of the front bank 21, which sectional view is taken in the direction of arrows along a line II-II in FIG. 1, and shows the cam driving gear mechanism 6 from the cam drive gear 61 to the third gear 63. As shown in FIG. 2, the cam drive gear 61 is fixed by spline fitting to the crankshaft 11 projecting to the right side of a right journal wall 12a of the front side cylinder block 12 on the inside of a right crankcase cover 24.

The second gear 62 is retained rotatably about a second gear base shaft 67 attached to the right journal wall 12a of the front side cylinder block 12 via a ball bearing 67a within the cam driving gear mechanism chamber 23 on the inside of the right crankcase cover 24.

The third gear 63 is retained rotatably about a third gear base shaft 68 attached to the right journal wall 12a via a ball bearing 68a within the cam driving gear mechanism chamber 23 between the right journal wall 12a of the front side cylinder block 12 and a right outer wall 12b.

Though not shown in FIG. 2, the fourth gear 64 is similarly retained rotatably about a fourth gear base shaft 69 (see FIG. 1) attached directly to the front side cylinder head 14 via a ball bearing within the cam driving gear mechanism chamber 23 connected to the cam driving gear mechanism chamber 23 in the front side cylinder block 12 and formed in the front side cylinder head 14.

The second gear 62, the third gear 63, and the fourth gear 64 which are idle gears serving as driving gears or driven gears in the cam driving gear mechanism 6 according to the above-described present embodiment are provided with a backlash adjusting device 8 for adjusting intervals to other gears meshing with the gears, that is, for adjusting a backlash.

Figure 3:
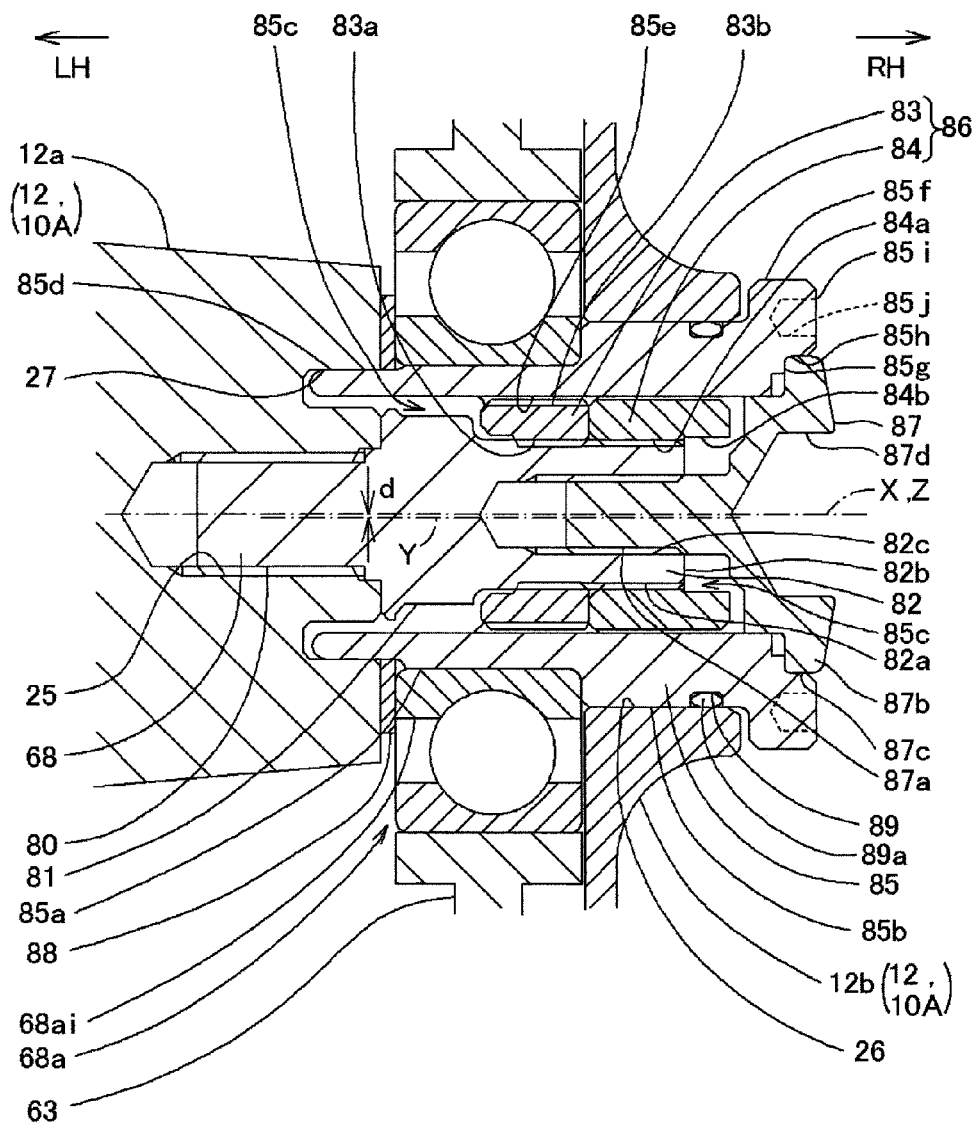
FIG. 3 is an enlarged view of a third gear base shaft 68 and the vicinity thereof, showing the backlash adjusting device 8 of a third gear 63 in FIG. 2.

FIG. 3 shows in enlarged dimension the third gear base shaft 68 of the third gear 63 in FIG. 2 and the vicinity of the third gear base shaft 68. The backlash adjusting device 8 provided to the third gear 63 will be described.

The backlash adjusting devices 8 provided to the second gear 62 and the fourth gear 64 are configured in a similar manner. The backlash adjusting devices 8 provided to the second to fourth gears 62 to 64 on the side of the rear bank 22 are also configured in a similar manner.

As shown in FIG. 3, the third gear 63 is located within the cam driving gear mechanism chamber 23 between the right journal wall 12a of the front side cylinder block 12 and the right outer wall 12b.

An attaching male screw portion 80 of the third gear base shaft ("base shaft" in the present invention) 68 supporting the third gear 63 is screwed and attached to an attaching female screw hole 25 in the right journal wall 12a of the front side cylinder block 12. A supporting shaft portion 82 extends out from a hexagonal head portion 81 formed for screwing, which is formed for screwing, to the outside (right). A male screw portion 82a is formed on the outer circumference of the supporting shaft portion 82 concentrically about an axis X of the third gear base shaft 68.

The supporting shaft portion 82 is also provided with a female screw hole 82c from an outer end 82b to the inside on the left side concentrically about the axis X.

As will be described later, a base shaft side spline engaging portion 83 and engaging portion fixing means 84 are screwed and externally fitted on the male screw portion 82a of the third gear base shaft 68. Further, an eccentric supporting shaft 85 is externally fitted on the outer circumferential side of the base shaft side spline engaging portion 83 and the engaging portion fixing means 84. The third gear 63 is rotatably supported by an eccentric cylindrical portion 85a of the eccentric supporting shaft 85, the eccentric cylindrical portion 85a being located within the cam driving gear mechanism chamber 23.

The eccentric supporting shaft 85 rotatably supports the third gear 63 on the outer circumference of the eccentric cylindrical portion 85a via the ball bearing 68a on the same axis, and has a central axis Z that is eccentric by an eccentricity d with respect to the center Y of the axis of rotation of the rotatably supported third gear 63, that is, the axis Y of the eccentric cylindrical portion 85a.

A supporting hole 26 into which to insert a concentric cylindrical portion 85b of a larger diameter which concentric cylindrical portion is formed concentrically about the central axis Z so as to be adjacent to the eccentric cylindrical portion 85a on the right side of the eccentric cylindrical portion 85a in the eccentric supporting shaft 85 is formed in the right outer wall 12b of the front side cylinder block 12, the right outer wall 12b being located on the outside of the cam driving gear mechanism chamber 23.

The supporting hole 26 is formed so as to have the same axis as the axis X of the third gear base shaft attached to the right journal wall 12a of the front side cylinder block 12, the right journal wall 12a of the front side cylinder block 12 being opposed to the supporting hole 26 with the cam driving gear mechanism chamber 23 interposed between the supporting hole 26 and the right journal wall 12a of the front side cylinder block 12.

When the concentric cylindrical portion 85b of the eccentric supporting shaft 85 is inserted into the supporting hole 26, the central axis Z of the eccentric supporting shaft 85 coincides with the axis X of the third gear base shaft 68.

A hollow hole 85c is drilled through the eccentric cylindrical portion 85a and the concentric cylindrical portion 85b so as to be concentrically parallel to the central axis Z of the eccentric supporting shaft 85, that is, concentrically parallel to the axis X of the third gear base shaft 68 in a state of the eccentric supporting shaft 85 being inserted in the supporting hole 26.

The third gear base shaft 68 can be located within the hollow hole 85c of the eccentric supporting shaft 85 so as to have the axis X of the third gear base shaft 68 coinciding with the central axis Z of the eccentric supporting shaft 85 in a state of the concentric cylindrical portion 85b of the eccentric supporting shaft 85 being inserted in the supporting hole 26.

An extension cylindrical portion 85d extends from a left end of the eccentric cylindrical portion 85a so as to be concentrically parallel to the axis X of the third gear base shaft 68, and is fitted into and supported by an annular groove 27 provided so as to surround the attaching female screw hole 25 of the right journal wall 12a and be concentrically parallel to the axis X in the right journal wall 12a into which the third gear base shaft 68 is screwed.

From the above, the outer circumference of the eccentric cylindrical portion 85a of the eccentric supporting shaft 85 has the axis Y with the predetermined eccentricity d, which axis Y is parallel to the axis X of the third gear base shaft 68 which axis X coincides with the central axis Z of the eccentric supporting shaft 85 in the state of the eccentric supporting shaft 85 being mounted on the third gear base shaft 68. When the eccentric supporting shaft 85 rotates about the axis X of the third gear base shaft 68 (that is, when the eccentric supporting shaft 85 rotates about the central axis Z of the eccentric supporting shaft 85), the eccentric cylindrical portion 85a is whirled or rotated at a radius d with respect to the axis X. The center of the axis of rotation (coinciding with the axis Y) of the third gear rotatably supported by the eccentric cylindrical portion 85a via the ball bearing 68a is also whirled or rotated at the radius d with respect to the axis X. Thus, a distance between the center of the second gear 62 or the fourth gear 64 as another gear that the third gear 63 meshes with and the center of the axis of rotation of the third gear 63 can be adjusted by a maximum of ±d. A clearance between the third gear 63 and the other gear that the third gear 63 meshes with, that is, a backlash can be adjusted by the adjustment.

The base shaft side spline engaging portion 83 having a female screw portion 83a and forming a nut member is screwed as a separate member on the male screw portion 82a of the supporting shaft portion 82 of the third gear base shaft 68. The base shaft side spline engaging portion 83 has a spline portion 83b on an outer circumference of the base shaft side spline engaging portion 83, which spline portion is spline-engaged with a spline portion 85e provided in an inner surface of the hollow hole 85c of the eccentric supporting shaft 85.

Hence, the extension cylindrical portion 85d on the left end side of the eccentric supporting shaft 85 is supported by the annular groove 27 in the right journal wall 12a of the crankcase 10, and the concentric cylindrical portion 85b on the right end side of the eccentric supporting shaft 85 is supported by the supporting hole 26 of the right outer wall 12b of the front side cylinder block 12. Thus, the eccentric supporting shaft 85 can rotate about the axis X, and because the eccentric supporting shaft 85 is spline-engaged with the base shaft side spline engaging portion 83, the eccentric supporting shaft 85 can rotate about the axis X on the third gear base shaft 68 together with the base shaft side spline engaging portion 83 according to screwed relation.

The engaging portion fixing means 84 having a female screw portion 84a and forming a nut member (a "second nut member" in the present invention) is further screwed on the male screw portion 82a on the right side of the base shaft side spline engaging portion 83. The engaging portion fixing device 84 has a hexagonal hole 84b for screwing operation at a right end of the engaging portion fixing device 84 (see FIG. 4), which can function as engaging portion fixing means.

As described above, the axis Y of the eccentric cylindrical portion 85a of the eccentric supporting shaft 85 can be revolved about the axis X with the eccentricity d as a radius by rotating the eccentric supporting shaft 85 about the axis X. The distance between the center of the third gear 63 rotatably supported by the eccentric cylindrical portion 85a via the ball bearing 68a (which center coincides with the eccentric axis Y) and the center of the second gear 62 or the fourth gear 64 as another gear that the third gear 63 meshes with can be adjusted by a maximum of ±d. A clearance between the third gear 63 and the other gear that the third gear 63 meshes with, that is, a backlash can be adjusted by the adjustment.

After a desirable clearance between the third gear 63 and the second gear 62 or the fourth gear 64 as another gear that the third gear 63 meshes with, that is, a backlash state is obtained by thus rotating the eccentric supporting shaft 85 about the axis X, the engaging portion fixing device 84 is tightened toward the base shaft side spline engaging portion 83 to fix the position of the base shaft side spline engaging portion 83 on the female screw portion 83a.

That is, fastening the base shaft side spline engaging portion 83 and the engaging portion fixing device 84 both forming a nut member to each other provides a double nut engaging state, and easily fixes the base shaft side spline engaging portion 83 on the female screw portion 83a and can simultaneously fix the eccentric supporting shaft 85 spline-engaged with the base shaft side spline engaging portion 83 at a desirably set rotational angle position (rotational angle position providing a desirable gear center distance, or a clearance between gears, by eccentricity).

That is, the base shaft side spline engaging portion 83 and the engaging portion fixing device 84 function as an adjusting portion 86 allowing the inner circumference of the eccentric supporting shaft 85 to be fitted over the outer circumference of the third gear base shaft 68 fixed to the right journal wall 12a of the front side cylinder block 12 as a wall part of the internal combustion engine 1 at a predetermined rotational angle position.

A flange portion 85f enlarged in a radial direction is provided at an outer end (right end) of the eccentric supporting shaft 85. In addition, a circular depression part 85g is provided to the flange portion 85f.

After the eccentric supporting shaft 85 is fixed at a desirable predetermined rotational position as described above, a lock bolt (which can function as a fixing means, fixing device, and/or fixing portion) 87 is fastened to the female screw hole 82c of the third gear base shaft 68.

The lock bolt 87 has a male screw portion 87a to be screwed into the female screw hole 82c, has an enlarged head portion 87b in the shape of a flange enlarged in the radial direction, and has a hexagonal hole 87d for fastening operation in the outside center of the enlarged head portion 87b.

The lock bolt 87 in a state of being fastened to the female screw hole 82c does not interfere with the base shaft side spline engaging portion 83 and the engaging portion fixing device 84, has the enlarged head portion 87b in pressure contact with the circular depression part 85g of the eccentric supporting shaft 85, and fastens the eccentric supporting shaft 85 to the right journal wall 12a via an inner ring 68ai of the ball bearing 68a and a collar member 88 to fix the eccentric supporting shaft 85 in a falling-off direction and a rotating direction.

An outer circumferential edge 87c of the enlarged head portion 87b is in close contact with an inner circumferential edge 85h of the circular depression part 85g formed at the outer end of the eccentric supporting shaft 85 to prevent dust from externally entering the hollow hole 85c of the eccentric supporting shaft 85.

Screw portions such as the attaching male screw portion 80, the male screw portion 82a, and the female screw hole 82c formed on the third gear base shaft 68 are formed in a screw direction as a tightening direction according to a direction of rotation of the third gear 63 supported by the eccentric supporting shaft 85 fitted over the third gear base shaft 68. Thus, the loosening of the screw portions due to the rotation of the third gear 63 can be prevented.

As shown in FIG. 1, the third gear 63 makes right-handed rotation (clockwise rotation) as viewed from a right side, and therefore the screw portions 80, 82a, and 82c of the third gear base shaft 68 are all formed by right-handed screws.

The second gear 62 and the fourth gear 64 make left-handed rotation (counterclockwise rotation), and therefore the gear portions of the second gear base shaft 67 and the fourth gear base shaft 69 are all formed by left-handed screws.

Figure 4:
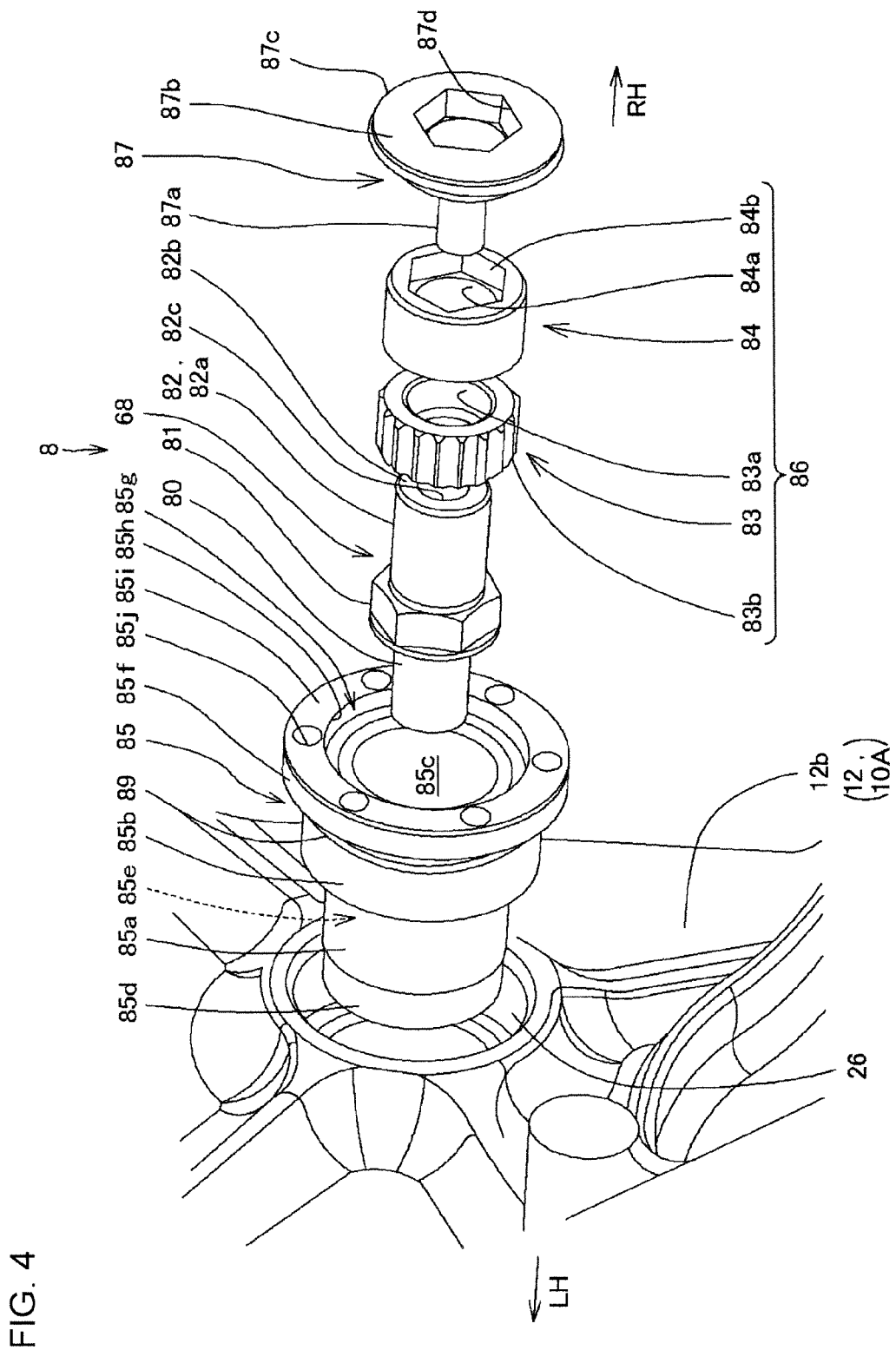
FIG. 4 is an exploded perspective view of the backlash adjusting device 8 in FIG. 3.

As also shown in FIG. 4, a plurality of tool holes 85j are provided at predetermined intervals on a same pitch circle in an outer end surface 85i of the flange portion 85f of the eccentric supporting shaft 85. An operation of adjusting and fixing the eccentric supporting shaft 85 at a desirable rotational angle position is facilitated by engaging a tool with the tool holes 85j in a tentatively assembled state of the eccentric supporting shaft 85 or the like.

In addition, a seal groove 89 is provided in the outer circumference of the concentric cylindrical portion 85b of the eccentric supporting shaft 85, and an O-ring ("seal member" in the present invention) 89a is interposed between the seal groove 89 and the supporting hole 26 of the right outer wall 12b of the front side cylinder block 12 forming a wall part of the internal combustion engine 1, to prevent leakage of oil inside the internal combustion engine 1.

An example of a procedure for adjusting and fixing the rotational angle position of the eccentric supporting shaft 85 in the backlash adjusting device 8 of the cam driving gear mechanism 6 according to the present embodiment as described above will be described in the following with reference to FIG. 3 and FIG. 4.

As shown in FIG. 3 and FIG. 4, the backlash adjusting device 8 according to the present embodiment includes the third gear base shaft 68, the eccentric supporting shaft 85, the base shaft side spline engaging portion 83 and the engaging portion fixing means 84 forming the adjusting portion 86, the lock bolt 87 as fixing means forming the fixing portion, the supporting hole 26 into which to insert the eccentric supporting shaft 85, and the like as described above at the third gear 63.

The base shaft side spline engaging portion 83 spline-engaged with the eccentric supporting shaft 85 is screwed onto the male screw portion 82a of the third gear base shaft 68 screwed and fixed in the right journal wall 12a of the front side cylinder block 12, and the eccentric supporting shaft 85 is fed to an innermost position (leftmost position) of the male screw portion 82a while inserted into the supporting hole 26 from the right to the left.

At the same time, the insertion, mounting, and the like of the third gear 63, the ball bearing 68a, the collar member 88, and the like are also performed.

Thereafter, the eccentric supporting shaft 85 is rotated counterclockwise on the male screw portion 82a in screwed relation together with the base shaft side spline engaging portion 83 so as to be screwed back to the right side, whereby a rotational angle position of the eccentric supporting shaft 85 is obtained at which position a clearance between the gears adjacent to and in mesh with each other, that is, a backlash state is desirable.

Then, the engaging portion fixing device 84 is screwed in from the right, and the base shaft side spline engaging portion 83 and the engaging portion fixing means are fastened to each other on the same male screw portion 82a of the third gear base shaft 68, so that the rotational angle position of the base shaft side spline engaging portion 83 and the eccentric supporting shaft 85 is fixed in a double nut engaging state.

Further, the lock bolt 87 is screwed into the female screw hole 82c of the third gear base shaft 68 and tightened, and the enlarged head portion 87b of the lock bolt 87 is brought into pressure contact with the circular depression part 85g of the eccentric supporting shaft 85, so that the eccentric supporting shaft 85 is fixed in a falling-off direction and a rotating direction.

Irrespective of the arrangement position of the spline portions 83b and 85e of the base shaft side spline engaging portion 83 and the eccentric supporting shaft 85, the base shaft side spline engaging portion 83 can be fixed to the male screw portion 82a at a free position, and the eccentric supporting shaft 85 can be fixed on the entire circumference of the third gear base shaft 68 at a free rotational angle position, so that a degree of freedom of clearance adjustment is greatly improved.

The adjustment and fixing of the rotational angle position of the eccentric supporting shaft 85 can be similarly performed also in the second gear 62 and the fourth gear 64, thus enabling the adjustment of clearance between the gears of the cam driving gear mechanism 6 as a whole, that is, backlash adjustment.

The constitution and action of the backlash adjusting device 8 in the third gear 63 of the front side cylinder block 12 have been described above. However, the backlash adjusting devices 8 of the second gear 62 and the fourth gear 64 are similar to the backlash adjusting device 8 in the third gear 63 of the front side cylinder block 12, and the backlash adjusting devices 8 in the rear bank 22 are also similar to the backlash adjusting device 8 in the third gear 63 of the front side cylinder block 12.

However, in the second gear 62, the second gear base shaft 67 is fixed to the right journal wall 12a of the crankcase 10 as a wall part of the internal combustion engine 1, and the eccentric supporting shaft 85 is supported by the supporting hole 26 provided in the right crankcase cover 24 as a wall part of the internal combustion engine 1. In the fourth gear 64, the fourth gear base shaft 69 is attached directly to a right inner wall 14a of the front side cylinder head 14, the right inner wall 14a being located on the left side of the cam driving gear mechanism chamber 23 in the front side cylinder head 14, and the eccentric supporting shaft 85 is supported by the supporting hole 26 provided in a right outer wall 14b of the front side cylinder head 14 (see FIG. 1). However, the basic constitution of the backlash adjusting devices 8 is similar to that in the third gear 63.

This similarly applies to the backlash adjusting devices 8 of the respective gears in the rear bank.

Also in the front side and rear side cylinder heads 14 and 15, the backlash adjusting devices 8 are provided to the fourth gears 64 provided directly to the front side and rear side cylinder heads 14 and 15 of the internal combustion engine 1. Thus, the backlash adjusting devices 8 can be provided easily without an increase in size by adopting the constitution of the backlash adjusting device 8 according to the present embodiment particularly in the cylinder heads 14 and 15 of the internal combustion engine 1 desired to be miniaturized.

Main features of the backlash adjusting device of the cam driving gear mechanism 6 according to the present embodiment will be summarized in the following.

In the backlash adjusting device 8 of the cam driving gear mechanism 6 according to the present embodiment, the rotational driving force of the crank is transmitted to the valve gear 3 of the internal combustion engine 1 by the cam driving gear mechanism 6 in which the second gear 62, the third gear 63, and the fourth gear 64 serving as driving gears and driven gears for transmitting the driving force by meshing with each other are interposed. The eccentric supporting shaft 85 rotatably supports at least one of the driving gears and the driven gears (all of the second gear 62, the third gear 63, and the fourth gear 64 in the present embodiment, of which gears the third gear 63 will be described in the following). That is, the third gear 63 on the outer circumference of the eccentric supporting shaft 85, and having the central axis Z eccentric with respect to the axis Y of rotation of the rotatably supported third gear 63 is disposed in the internal combustion engine 1 so as to be able to be fixed at a predetermined rotational angle position about the central axis Z. The eccentric supporting shaft adjusts an amount of clearance between the gears meshing with each other, and is fitted over the third gear base shaft 68 fixed to the internal combustion engine 1 such that the central axis Z of the eccentric supporting shaft 85 coincides with the axis X of the third gear base shaft 68. The backlash adjusting device 8 of the cam driving gear mechanism 6 includes the adjusting portion 86 allowing the hollow hole 85c of the eccentric supporting shaft 85 to be fitted over the outer circumference of the third gear base shaft 68 at the predetermined rotational angle position with respect to the third gear base shaft 68 and the fixing portion formed by the lock bolt 87 for fixing the eccentric supporting shaft 85 to the third gear base shaft 68. The lock bolt 87 is screwed to the third gear base shaft 68 on the axis X of the third gear base shaft 68.

Therefore, the eccentric supporting shaft 85 of the backlash adjusting device 8 is fitted over the outer circumference of the third gear base shaft 68 fixed to the internal combustion engine 1. The eccentric supporting shaft 85 is fixed to the third gear base shaft 68 by the lock bolt 87 screwed on the axis X of the third gear base shaft 68 as the fixing portion. Thus, the adjusting portion 86 is disposed inside the eccentric supporting shaft 85, the lock bolt 87 is located on the axis X of the third gear base shaft 68, and the adjusting portion 86 and the lock bolt 87 can be disposed on the inside of an outside diameter of the eccentric supporting shaft 85. Consequently, the members occupying the outside of the internal combustion engine 1 can be reduced in number and miniaturized, and the occurrence of noise from the cam driving gear mechanism 6 can be prevented by the adjustment of a backlash in the cam driving gear mechanism 6.

The third gear base shaft 68 can be provided with the base shaft side spline engaging portion 83 spline-engaged with the eccentric supporting shaft 85 as a separate member. The base shaft side spline engaging portion 83 is formed by the nut member having the female screw portion 83a screwed on the male screw portion 82a provided on the outer circumference of the third gear base shaft 68. The engaging portion fixing device 84 for fixing the base shaft side spline engaging portion 83 to a predetermined position of the male screw portion 82a is provided. The base shaft side spline engaging portion 83 and the engaging portion fixing device 84 form the adjusting portion 86.

Therefore, because the base shaft side spline engaging portion 83 is formed by the member separate from the third gear base shaft 68 as the adjusting portion 86, screwed on the male screw portion 82a of the third gear base shaft 68, and fixed by the engaging portion fixing device 84, irrespective of the arrangement position of the spline portions 83b and 85e, the base shaft side spline engaging portion 83 can be fixed to the male screw portion 82a at a free position, and the eccentric supporting shaft 85 can be fixed on the entire circumference of the third gear base shaft 68 at a free rotational angle position, so that a degree of freedom of clearance adjustment is greatly improved.

The engaging portion fixing device 84, configured to fix the base shaft side spline engaging portion 83, is formed by a second nut member screwed on the male screw portion 82a of the third gear base shaft 68. Thus, the base shaft side spline engaging portion 83 can be fixed easily by a simple constitution based on double nut engagement with the base shaft side spline engaging portion 83.

Screw portions such as the attaching male screw portion 80, the male screw portion 82a, and the female screw hole 82c formed on the third gear base shaft 68 are formed in a screw direction as a tightening direction according to a direction of rotation of the third gear 63 supported by the eccentric supporting shaft 85 fitted over the third gear base shaft 68. The screw portions are therefore formed in the tightening direction on the third gear base shaft 68 according to the direction of rotation of the third gear 63. Thus, the loosening of the screw portions due to the rotation of the third gear 63 can be prevented.

The lock bolt 87 has the male screw portion 87a screwed into the female screw hole 82c of the third gear base shaft 68, and the enlarged head portion 87b in the shape of a flange enlarged in the radial direction is in pressure contact with the circular depression part 85g at the outer end of the eccentric supporting shaft 85 and fastens the eccentric supporting shaft 85 to the right journal wall 12a via the inner ring 68ai of the ball bearing 68a and the collar member 88, so that the eccentric supporting shaft 85 can be fixed in a falling-off direction and a rotating direction.

The backlash adjusting device of the cam driving gear mechanism according to the present invention has been described above on the basis of one example which is applicable to several embodiments. However, the present invention is of course not limited to that mode, but the present invention includes inventions carried out in various modes without departing from the spirit of the invention of each claim.

For example, the backlash adjusting device may be provided to only a part of the gears of the cam driving gear mechanism (so-called gear train), and the number of gears of the cam driving gear mechanism is not limited either.

Furthermore, the driving gear mechanism provided with the backlash adjusting device is not limited to use for camshafts, but can be adopted as a driving gear mechanism in which accuracy of meshing between gears for a balancer shaft or the like matters.

In addition, the internal combustion engine is not limited to a DOHC water-cooled V-type four-cylinder four-stroke-cycle internal combustion engine, but may be other than the V-type and may have any number of cylinders, and may be an internal combustion engine other than a water-cooled internal combustion engine. In addition, the crankcase of the internal combustion engine is not limited to a crankcase divided into an upper side and a lower side, but may be a crankcase divided into a left side and a right side.

The present invention can be similarly carried out also in internal combustion engines whose arrangement in a left-right direction is opposite in the left-right direction from that shown in the foregoing embodiment.

The internal combustion engine including the backlash adjusting device of the cam driving gear mechanism according to the present invention is not limited to an internal combustion engine mounted in a motorcycle, but may be mounted in various small vehicles such as buggy vehicles and the like. Further, the internal combustion engine may be a stationary internal combustion engine. However, the present invention can be carried out effectively especially in an internal combustion engine for a small vehicle such as a motorcycle or the like which internal combustion engine is desired to be miniaturized.

DESCRIPTION OF REFERENCE SYMBOLS

1 . . . Internal combustion engine, 3 . . . Valve gear, 6 . . . Cam driving gear mechanism, 8 . . . Backlash adjusting device, 10 . . . Crankcase, 10A . . . Upper side crankcase, 10B . . . Lower side crankcase, 10a . . . Mating surface, 11 . . . Crankshaft, 12 . . . Front side cylinder block, 12a . . . Right journal wall, 12b . . . Right outer wall, 14 . . . Front side cylinder head, 16 . . . Front side cylinder head cover, 21 . . . Front bank, 23 . . . Cam driving gear mechanism chamber, 24 . . . Right crankcase cover, 25 . . . Attaching female screw hole, 26 . . . Supporting hole, 61 . . . Cam drive gear, 62 . . . Second gear (idle gear), 63 . . . Third gear (idle gear), 64 . . . Fourth gear (idle gear), 65 . . . Driven gear for an inlet cam, 66 . . . Driven gear for an exhaust cam, 68 . . . Third gear base shaft ("base shaft" in the present invention), 68a . . . Ball bearing, 80 . . . Attaching male screw portion, 82 . . . Supporting shaft portion, 82a . . . Male screw portion, 82c . . . Female screw hole, 83 . . . Base shaft side spline engaging portion, 83a . . . Female screw portion, 83b . . . Spline portion, 84 . . . Engaging portion fixing device, 84a . . . Female screw portion, 85 . . . Eccentric supporting shaft, 85a . . . Eccentric cylindrical portion, 85b . . . Concentric cylindrical portion, 85c . . . Hollow hole, 85e . . . Spline portion, 85f . . . Flange portion, 85g . . . Circular depression part, 85h . . . Inner circumferential edge, 85i . . . Outer end surface, 85j . . . Tool hole, 86 . . . Adjusting portion, 87 . . . Lock bolt, 87a . . . Male screw portion, 87b . . . Enlarged head portion, 87c . . . Outer circumferential edge, 89 . . . Seal groove, 89a . . . O-ring ("seal member" in the present invention), 101 . . . Motorcycle, X . . . Axis of the third gear base shaft 68, Y . . . Axis of the eccentric cylindrical portion 85a of the eccentric supporting shaft 85 (center of an axis of rotation of the third gear 63), Z . . . Central axis of the eccentric supporting shaft 85

The invention claimed is:

1. An internal combustion engine, comprising:
a crankshaft, said crankshaft being configured to transmit a rotational driving force to a valve gear;
a cam driving gear mechanism including a driving gear and a driven gear, said driving gear and driven gear being configured to transmit the driving force by meshing with each other;
an eccentric supporting shaft rotatably supporting at least one of the driving gear and the driven gear on an outer circumference thereof, said eccentric supporting shaft having a central axis eccentric with respect to a center of an access of rotation of the driving gear or the driven gear rotatably supported, said eccentric supporting shaft being configured in the internal combustion to be fixed at a predetermined rotational angle position about the central axis, and to adjust an amount of clearance between a pair of the driving gear and the driven gear;
said internal combustion engine further comprising:
a base shaft fixed therein, wherein the eccentric supporting shaft is fitted over the base shaft such that the central axis of the eccentric supporting shaft coincides with an axis of the base shaft; and
a backlash adjusting device, said backlash adjusting device including an adjusting portion configured to allow an inner circumference of the eccentric supporting shaft to be fitted over an outer circumference of the base shaft at the predetermined rotational angle position with respect to the base shaft, and a fixing portion configured to fix the eccentric supporting shaft to the base shaft by a fixing device attached to the base shaft on the axis of the base shaft.

2. The internal combustion engine according to claim 1, wherein the base shaft includes a base shaft side spline engaging portion spline-engaged with the eccentric supporting shaft as a separate member, the base shaft side spline engaging portion comprising a first nut member having a female screw portion screwed onto a male screw portion provided on the outer circumference of the base shaft, and an engaging portion fixing device configured to fix the base shaft side spline engaging portion to a predetermined position of the male screw portion, wherein the base shaft side spline engaging portion and the engaging portion fixing device form the adjusting portion.

3. The internal combustion engine according to claim 2, wherein the engaging portion fixing device comprises a second nut member screwed on the male screw portion of the base shaft.

4. The internal combustion engine according to claim 1, wherein a screw portion formed on the base shaft is formed in a screw direction as a tightening direction according to a direction of rotation of the driving gear or the driven gear supported by the eccentric supporting shaft fitted over the base shaft.

5. The internal combustion engine according to claim 1, wherein an outer edge of the fixing device is in close contact with an entire circumference of an inner circumferential edge of a circular depression part formed at an outer end of the eccentric supporting shaft.

6. The internal combustion engine according to claim 1, wherein tool holes are provided at predetermined interval on a same pitch circle in an outer end surface of the eccentric supporting shaft.

7. The internal combustion engine according to claim 1, further comprising a seal member interposed between the outer circumference of the eccentric supporting shaft and a wall part of the internal combustion engine, wherein the wall part supports the eccentric supporting shaft.

8. The internal combustion engine according to claim 1, further comprising a cylinder head, and wherein the backlash adjusting device is provided to the driving gear or the driven gear provided directly to the cylinder head.

9. An internal combustion engine, comprising:
crankshaft means for transmitting a rotational driving force to a valve gear;
cam driving gear means including a driving gear and a driven gear for meshing with each other;
eccentric supporting shaft means for rotatably supporting at least one of the driving gear and the driven gear on an outer circumference thereof, said eccentric supporting shaft means having a central axis eccentric with respect to a center of an access of rotation of the driving gear or the driven gear rotatably supported, said eccentric supporting shaft means for adjusting an amount of clearance between a pair of the driving gear and the driven gear;
said internal combustion engine further comprising:
base shaft means fixed therein, wherein the eccentric supporting shaft is fitted over the base shaft such that the central axis of the eccentric supporting shaft coincides with an axis of the base shaft; and backlash adjusting means, said backlash adjusting means including an adjusting means for allowing an inner circumference of the eccentric supporting shaft means to be fitted over an outer circumference of the base shaft means at a predetermined rotational angle position with respect to the base shaft means, and a fixing means for fixing the eccentric supporting shaft to the base shaft by a fixing device attached to the base shaft means on the axis of the base shaft means.

10. The internal combustion engine according to claim 9, wherein the base shaft means includes a base shaft side spline engaging means for being spline-engaged with the eccentric supporting shaft means as a separate member, the base shaft side spline engaging means comprising a first nut member having a female screw portion screwed onto a male screw portion provided on the outer circumference of the base shaft means, and an engaging portion fixing means for fixing the base shaft spline engaging means to a predetermined position of the male screw portion, wherein the base shaft side spline engaging means and the engaging portion fixing means form the adjusting means.

11. The internal combustion engine according to claim 10, wherein the engaging portion fixing means comprises a second nut member screwed on the male screw portion of the base shaft means.

12. The internal combustion engine according to claim 9, wherein a screw portion formed on the base shaft is formed in a screw direction as a tightening direction according to a direction of rotation of the driving gear or the driven gear supported by the eccentric supporting shaft fitted over the base shaft.

13. The internal combustion engine according to claim 9, wherein an outer edge of the fixing means for fixing the eccentric supporting shaft means and the base shaft means is in close contact with an entire circumference of an inner circumferential edge of a circular depression part formed at an outer end of the eccentric supporting shaft means.

14. The internal combustion engine according to claim 9, wherein tool holes are provided at predetermined interval on a same pitch circle in an outer end surface of the eccentric supporting shaft means.

15. The internal combustion engine according to claim 9, further comprising a seal member interposed between the outer circumference of the eccentric supporting shaft means and a wall part of the internal combustion engine, wherein the wall part supports the eccentric supporting shaft means.

16. The internal combustion engine according to claim 9, further comprising a cylinder head, and wherein the backlash adjusting means is provided to the driving gear or the driven gear provided directly to the cylinder head.

* * * * *